United States Patent
Papadopoulos et al.

(10) Patent No.: US 9,042,009 B2
(45) Date of Patent: May 26, 2015

(54) PASSIVE DEVICE AND METHOD FOR THE COHERENT COMBINATION OF A PLURALITY OF OPTICAL AMPLIFIERS

(75) Inventors: Dimitris Papadopoulos, Paris (FR); Marc Hanna, Limours (FR); Louis Daniault, Issy Les Moulineaux (FR)

(73) Assignee: ECOLE POLYTECHNIQUE, Palaiseau (FR)

( * ) Notice: Subject to any disclaimer, the term of this patent is extended or adjusted under 35 U.S.C. 154(b) by 0 days.

(21) Appl. No.: 14/232,317

(22) PCT Filed: Jul. 10, 2012

(86) PCT No.: PCT/FR2012/051631
§ 371 (c)(1),
(2), (4) Date: Sep. 9, 2014

(87) PCT Pub. No.: WO2013/007945
PCT Pub. Date: Jan. 17, 2013

(65) Prior Publication Data
US 2014/0376085 A1    Dec. 25, 2014

(30) Foreign Application Priority Data
Jul. 11, 2011    (FR) ..................... 11 56294

(51) Int. Cl.
*H01S 3/00* (2006.01)
*H01S 3/23* (2006.01)
(Continued)

(52) U.S. Cl.
CPC ............... *H01S 3/005* (2013.01); *H01S 3/2308* (2013.01);
(Continued)

(58) Field of Classification Search
CPC .................... H01S 3/23; H01S 3/2308
USPC .............. 359/341.2, 349; 385/31, 47; 372/97, 372/108
See application file for complete search history.

(56) References Cited

U.S. PATENT DOCUMENTS 5,162,940 A * 11/1992 Brandelik ...................... 359/333
5,307,369 A *  4/1994 Kimberlin ..................... 372/108
(Continued)

FOREIGN PATENT DOCUMENTS

WO    2007/148043    12/2007

OTHER PUBLICATIONS

International Search Report dated Mar. 6, 2013, corresponding to PCT/FR2012/051631.
(Continued)

*Primary Examiner* — Mark Hellner
(74) *Attorney, Agent, or Firm* — Young & Thompson

(57) ABSTRACT

The invention relates to a passive device for the coherent combination of at least two optical amplifiers. According to the invention, said device comprises an interferometer having at least four branches (B1, B2, B3, B4) and comprising optical means for separating and combining polarization, said means having four inlet-outlet ports that are respectively connected to a branch. The first branch comprises a first polarization means, a first optical amplifier and a first mirror; the second branch comprises a second polarization means, a second optical amplifier and a second mirror; the third branch comprises a third polarization means and a third mirror; the fourth branch (B4) is an inlet-outlet branch of the interferometer; and the first, second and third polarization means are designed such that a polarized optical beam entering respectively into the first, second or third branch and reflected by the mirror at the end of said branch forms a polarized optical beam that leaves said branch with a polarization that is orthogonal to the polarization of the polarized optical beam entering said branch.

16 Claims, 4 Drawing Sheets

Figure 1:
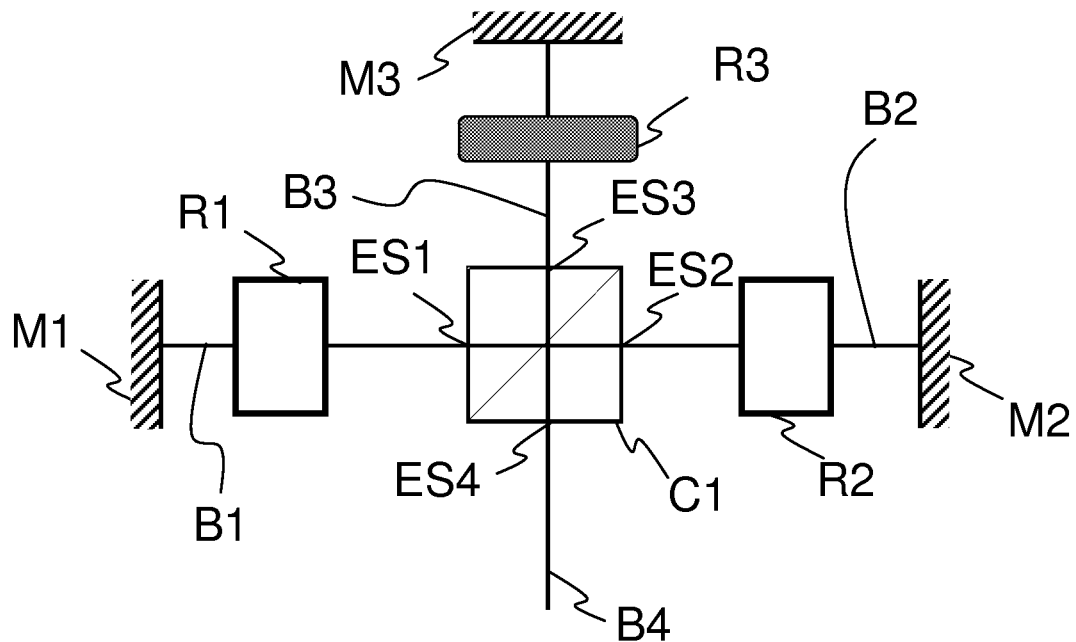

(51) Int. Cl.
*G02B 27/28* (2006.01)
*H01S 3/067* (2006.01)
*H01S 3/16* (2006.01)

(52) U.S. Cl.
CPC ............... *H01S 3/23* (2013.01); *H01S 3/2316* (2013.01); *H01S 3/2333* (2013.01); *H01S 3/06758* (2013.01); *H01S 3/1618* (2013.01); *H01S 3/165* (2013.01); *H01S 3/2325* (2013.01); *H01S 3/0064* (2013.01); *G02B 27/283* (2013.01)

(56) References Cited

U.S. PATENT DOCUMENTS 5,832,020 A 11/1998 Kong
5,999,552 A * 12/1999 Bogner et al. ............. 372/43.01
2006/0050366 A1 3/2006 Kong et al.
2009/0245304 A1 10/2009 Peng et al.

OTHER PUBLICATIONS

Hong Kong, et al.; "Long-Term Stabilized Two-Beam Combination Laser Amplifier With Stimulated Brillouin Scattering Mirrors"; Applied Physics Letters; vol. 92, No. 2; Jan. 17, 2008; pp. 21120-1-21120-3; XP012106980.

* cited by examiner

PASSIVE DEVICE AND METHOD FOR THE COHERENT COMBINATION OF A PLURALITY OF OPTICAL AMPLIFIERS

BACKGROUND OF THE INVENTION

The present invention relates to a device and a method for the coherent combination of optical beams or lasers separately amplified. The coherent combination of optical beams is a very promising technique for the development of high energy and/or high average power laser systems.

The constant tendency to develop lasers with higher and higher power and/or energy has to face different difficulties of realization. On the one hand, the power increase of a laser system generally induces a degradation of the beam quality, and on the other hand the extraction efficiency at high powers is limited by thermal effects occurring inside the amplifier materials.

A solution contemplated to obtain a high energy and/or high power beam is to use several sources or several independent amplifiers and to combine the beams coming from these different sources or these different amplifiers. This solution allows limiting the negative effects of thermal degradation induced for example in each of the amplifiers. However, for the combined beam to have the same optical qualities (spatial, spectral and temporal) as a single optical beam, it is not only required to spatially and temporally superimpose several optical beams, but the combination of the different beams has also to be coherent, i.e. the relative phase difference between the beams has to be null and stable over time. The condition of coherent superimposition is very difficult to achieve for optical beams because the phase difference has then to stay lower than a fraction of optical wavelength. Indeed, the relative phases of the different beams may fluctuate rapidly. The most difficult technical problem posed by the coherent recombination is to maintain a constant relative phase between different optical beams.

The coherent recombination of several optical beams has nevertheless been made by means of either passive or active devices.

DESCRIPTION OF THE RELATED ART

The publication "Laser beam combining for High-Power, high-radiance sources", of T. Y. Fan, IEEE Journal of selected topics in Quantum Electronics, vol. 11, n° 3, 2005, indicates the fundamental conditions required to perform a combination of laser beams (control of the power, relative phase, polarization, amplitude and alignment of each beam to be combined) and describes different methods for the coherent combination of optical beams, in order to obtain a high average power beam with almost-ideal spatial, temporal, spectral and polarization qualities.

The patent document U.S. Pat. No. 5,307,369 (D. E. Kimberlin) describes a passive system for the coherent combination of two amplifier mediums placed inside a common resonant cavity divided into two sub-cavities by a semi-reflective mirror. This device is similar to a double optical counter-reaction oscillator, a part of the beam emitted by the first laser amplifier being injected in the sub-cavity of the second laser amplifier, and vice versa. The output combined laser beam is a result of multiple coherent reflections occurring in the laser cavity. This device allows doubling the average power of a continuous laser beam or of synchronized laser pulses emitted by the two lasers. However, the differences of optical paths between the two sub-cavities induce phase-shifts that limit the stability of the passive device and the output power. Moreover, these passive devices for coherent combination operate in a cavity and cannot be used as amplifiers. And it is desirable to combine a great number of beams outside a cavity to benefit from more possibilities of source architectures.

The passive combination appearing limited, various active devices for the coherent recombination of optical beams have been proposed. The active recombination is based on a direct or indirect measurement of the relative phase between the optical beams to be combined and on the introduction of a phase-shift actively controlled by a negative feedback loop on each optical beam. An active device for coherent recombination generally takes a part of the beam before or after recombination to extract therefrom a measurement of the phase-shift between the optical beams and adapts in real time the relative phase on each beam by means of an acousto-optic modulator, a piezoelectric mirror, or by adjustment of the optical pumping power.

Thus, for the amplifiers, an active device for coherent combination is generally used [Wei Liang, Naresh Satyan, Firooz Aflatouni, Amnon Yariv, Anthony Kewitsch, George Rakuljic, and Hossein Hashemi, "Coherent beam combining with multilevel optical phase-locked loops," J. Opt. Soc. Am. B 24, 2930-2939 (2007); T. Shay, V. Benham, J. T. Baker, A. D. Sanchez, D. Pilkington, and C. A. Lu, IEEE J. Sel. Top. Quantum Electron. 13, 480 (2007)]. The coherent combination has been shown in continuous and almost-continuous regime, and recently in femtosecond regime [cf. the publications L. Daniault, M. Hanna, L. Lombard, Y. Zaouter, E. Mottay, D. Goular, P. Bourdon, F. Druon, and P. Georges, "Coherent beam combining of two femtosecond fiber chirped-pulse amplifiers," Opt. Lett. 36, 621-623 (2011)].

However, the active devices for coherent recombination are complicated because they need a real-time feedback control electronic system whose implementation is difficult and expensive.

SUMMARY OF THE INVENTION

One of the objects of the invention is to propose a device for the coherent combination of at least two amplified optical beams that are stable over time and capable of supporting high energies and/or powers.

Another object of the invention is to propose a device of the coherent combination of N optical amplifiers.

Still another object of the invention is to propose a device and a method for coherent combination that can be applied to any temporal regime, from the continuous regime to the femtosecond pulses, to any type of optical amplifier.

The present invention has for object to remedy the drawbacks of the prior art techniques of coherent combination and relates more particularly to a passive device for the coherent combination of a plurality of optical amplifiers.

According to the invention, the passive device of coherent combination comprises an amplitude-division interferometer having at least four branches, said interferometer comprising optical polarization spotting and combining means having four input-output ports, each input-output port being respectively connected to one of the four branches, the first branch comprising a first polarization means, a first bidirectional optical amplifier and a first mirror forming the end of said first branch; the second branch comprising a second polarization means, a second bidirectional optical amplifier and a second mirror forming the end of the second branch; the third branch comprising a third polarization means and a third mirror forming the end of said third branch; said first, second and third polarization means being configured so that a polarized optical beam entering respectively said first, second or third branch, respectively by the first, second or third input-output port is reflected respectively by the first, second, third mirror to form a polarized optical beam exiting said branch, having a polarization orthogonal to the polarization of said polarized optical beam entering said branch; the fourth branch being an input-output branch of said interferometer arranged so as to receive and direct a polarized incident optical beam toward the fourth input-output port; the optical polarization splitting and combining means being configured so as to split in polarization the polarized incident beam into a first secondary input beam and a second secondary input beam, said first and second secondary input beams having mutually orthogonal polarizations, the first secondary input beam travelling through the first, second and third branches of the interferometer following a first optical path to form a first amplified output beam and the second secondary input beam travelling through the first, second and third branches of the interferometer following a second optical path, reciprocal to the first optical path, to form a second amplified output beam, said first and second amplified output beams having mutually orthogonal polarizations and said splitting and recombining means being configured so as to receive and to spatially, temporally and coherently recombine said first amplified output beam and said second output amplified beam, to form a coherent output beam propagating in the fourth branch in the reverse direction with respect to the polarized incident optical beam.

According to a particular embodiment of the device of the invention, said splitting and recombining means comprise a polarization splitting cube.

According to various aspects of particular embodiments of the device of the invention:
the device further comprises an optical isolator arranged on the fourth branch;
said first, second and/or third polarization means comprise a quarter-wave plate or a bidirectional Faraday rotator configured so as to rotate the polarization of a linearly polarized optical beam by 90 degrees after a double passage;
said first and second optical amplifiers have the same optical amplification gain;
said first and second optical amplifiers each comprise respectively a multiple-passage optical amplifier;
said first and second optical amplifiers are optical fiber amplifiers.

According to a particular embodiment, the invention relates to a passive device for the coherent combination of four optical amplifiers comprising a passive device for the coherent combination of two optical amplifiers according to one of the embodiments described, wherein the two sub-units comprising an optical amplifier and a mirror of the first and the second branches, respectively, are each respectively replaced by another passive device of the coherent combination of two optical amplifiers according to one of the embodiments described.

According to a particular embodiment, the invention relates to a passive device for the coherent combination of $2^n$ optical amplifiers, n being an integer higher than or equal to one, comprising $(1+2^{n-1})$ passive devices for the coherent combination of two optical amplifiers according to one of the embodiments described, wherein $2^{n-1}$ passive devices for the coherent combination of two optical amplifiers are arranged symmetrically on the branches of a device according to one of the embodiments described.

The invention also relates to a passive method for the coherent combination of a plurality of optical amplifiers, comprising the following steps:

coupling a polarized incident beam to the fourth branch of a passive device of coherent combination according to one of the embodiments described,
splitting the polarized incident beam into a first secondary input beam and a second secondary input beam, said first and second secondary input beams having mutually orthogonal polarizations,
addressing the first secondary input beam so that it travels successively through the first, second and third branches of the interferometer following a first optical path and so that the first secondary input beam is amplified twice by the first amplifier, then twice by the second amplifier, to form a first amplified output beam,
addressing the second secondary input beam so that it travels successively through the third, second and first branches of the interferometer following a second optical path, reciprocal to the first optical path, and so that the second secondary input beam is amplified twice by the second amplifier, then twice by the first amplifier, to form a second amplified output beam,
modifying the polarization of the first secondary beam at each passage in the first, second and third branches of the interferometer, the polarization of the first secondary beam entering a branch being orthogonal to the polarization of the first secondary beam exiting said branch,
modifying the polarization of the second secondary beam at each passage in the first, second and third branches of the interferometer, the polarization of the second secondary beam entering a branch being orthogonal to the polarization of the second secondary beam exiting said branch,
recombining spatially, temporally and in polarization the first amplified output beam and the second amplified output beam, to form an amplified coherent output beam propagating in the fourth branch in the reverse direction with respect to the polarized incident optical beam.

The invention will find a particularly advantageous application in optical amplification systems and lasers.

The present invention also relates to the characteristics that will become more apparent from the following description and that will have to be considered in isolation or according to any of their technically possible combinations.

BRIEF DESCRIPTION OF THE DRAWING FIGURES

Figure 2:
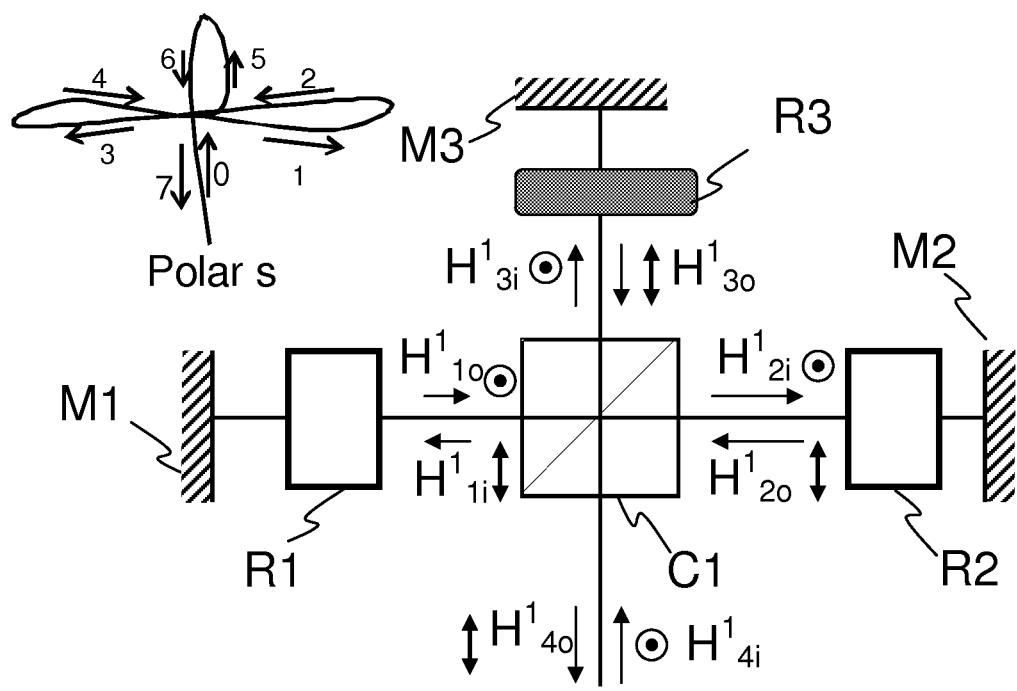
Figure 3:
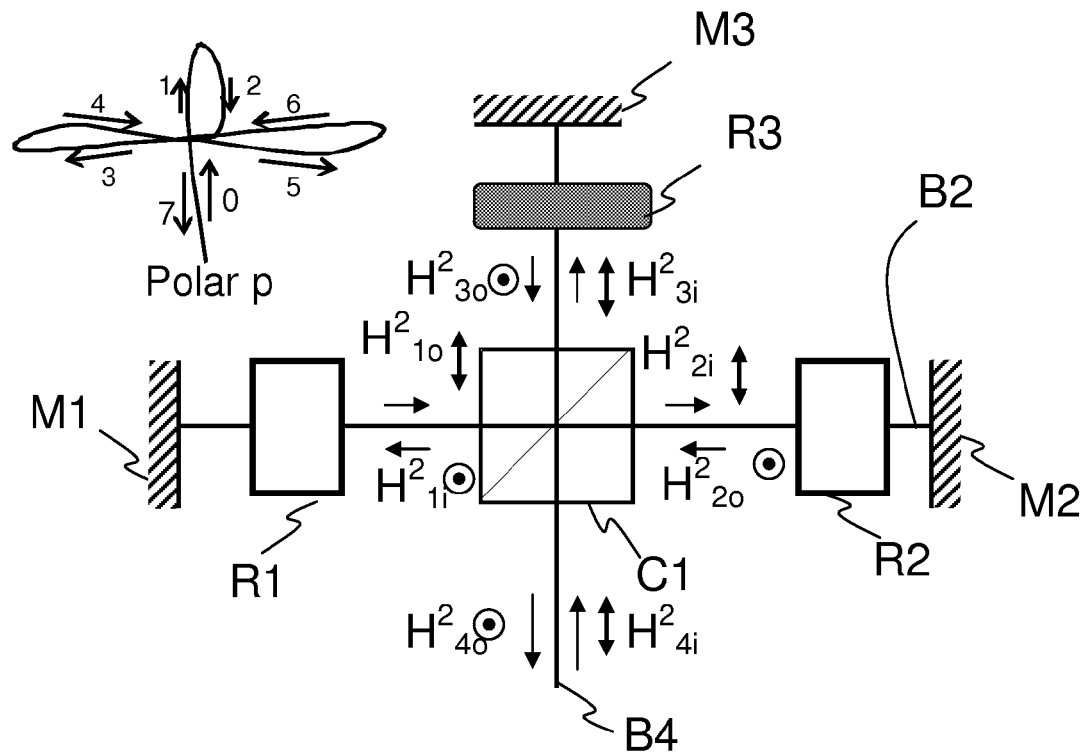
Figure 4:
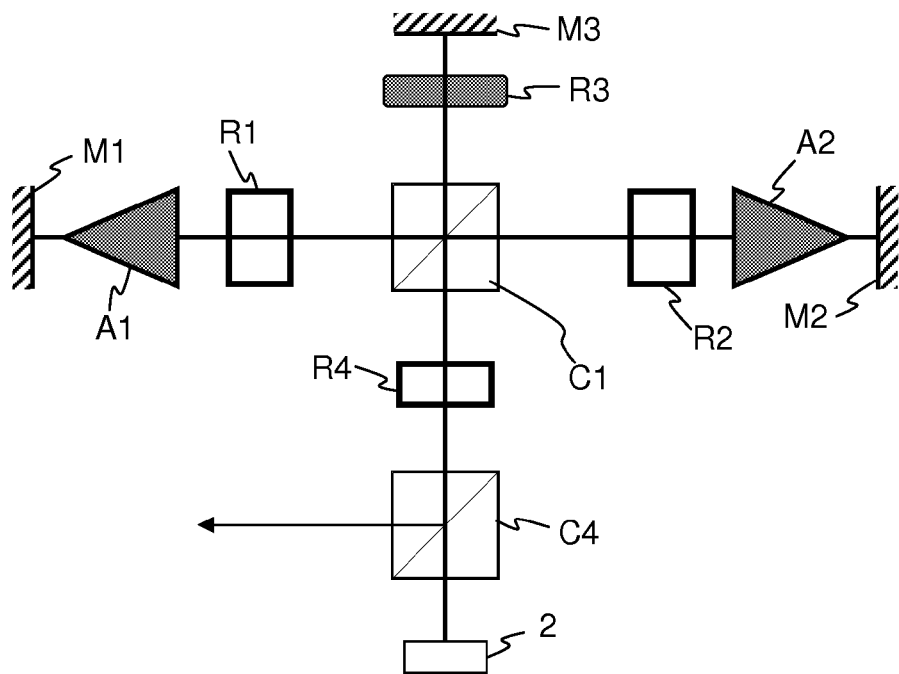
Figure 5:
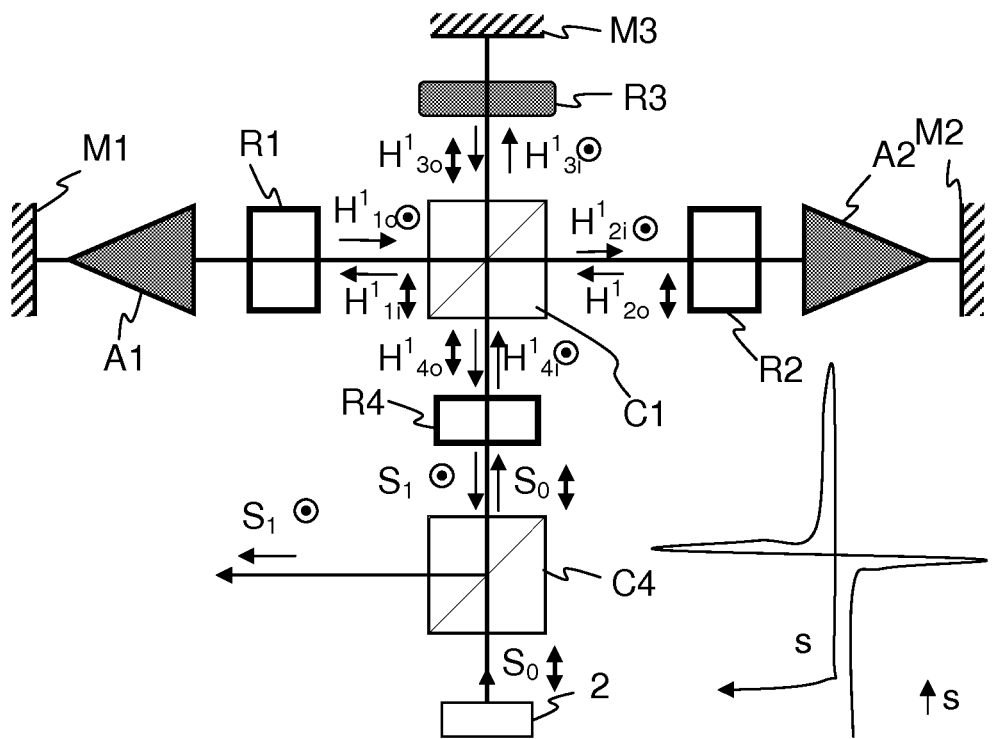
Figure 6:
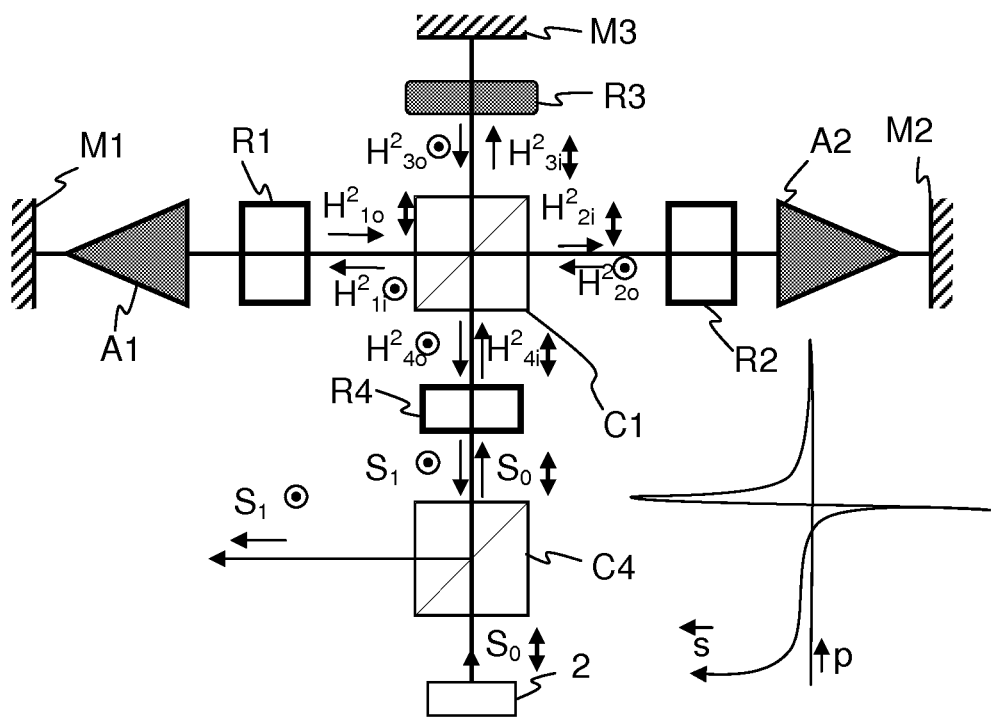
Figure 7:
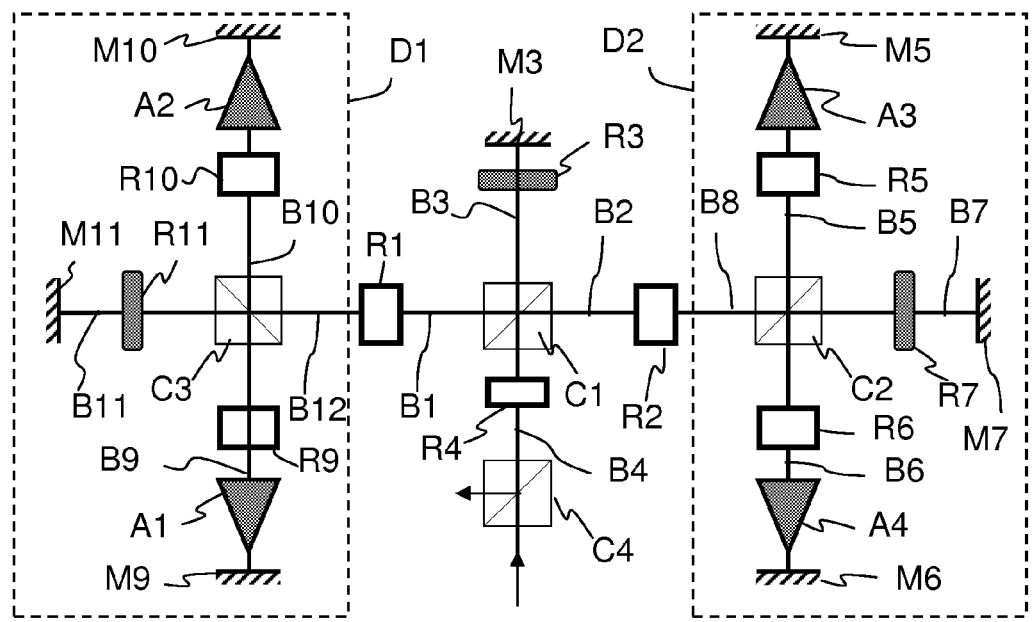
Figure 8:
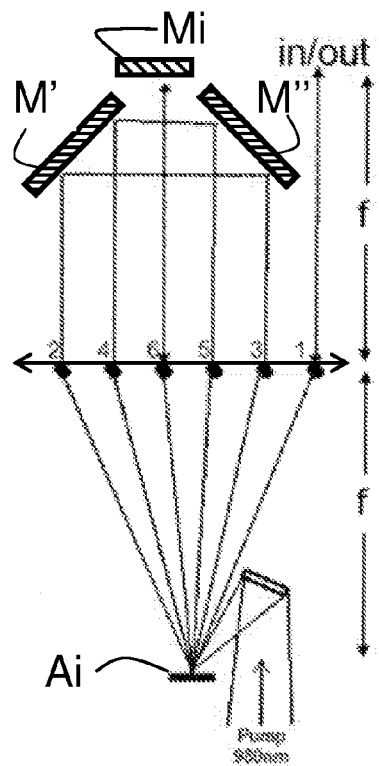

This description, which is given only by way of non-limitative example, will permit to better understood how the invention can be implemented with reference to the appended drawings, in which:

FIG. 1 schematically shows the architecture of a base cell of a passive device for coherent combination according to the invention;

FIG. 2 schematically illustrates the propagation of an initially s-polarized beam through a base cell as shown in FIG. 1; the order of passage of an initially s-polarized beam through the different branches is schematically shown as an insert;

FIG. 3 schematically illustrates the propagation of an initially p-polarized beam through a base cell as shown in FIG. 1; the order of passage of an initially p-polarized beam through the different branches is schematically shown as an insert;

FIG. 4 schematically shows the architecture of a device for the combination of two optical amplifiers according to an embodiment of the invention;

FIG. 5 schematically illustrates the propagation of an initially s-polarized beam through a device for the combination of two amplifiers as shown in FIG. 4; the order of passage of an initially s-polarized beam through the different branches of the device is schematically shown as an insert;

FIG. 6 schematically illustrates the propagation of an initially p-polarized beam through a device for the combination of two amplifiers as shown in FIG. 4; the order of passage of an initially p-polarized beam through the different branches of the device is schematically shown as an insert;

FIG. 7 schematically shows the architecture of a device for the combination of four optical amplifiers according to another embodiment of the invention;

FIG. 8 schematically illustrates a multiple-passage amplifier that can be used in a particular embodiment of the invention.

DETAILED DESCRIPTION

A passive system for the coherent combination of an arbitrary number of optical amplifiers is proposed, which can be applied to any type of amplifier and temporal regime, from the continuous regime to the femtosecond pulses. Ideally, the number N of amplifiers combined is equal to $N=2^n$, where n is an integer.

FIG. 1 shows a base cell allowing splitting an optical beam into two secondary optical beams, and recombining coherently the two partial beams after they have travel through reciprocal optical paths.

The base cell of FIG. 1 represents an interferometer with more than two branches. In an exemplary embodiment, the base cell comprises an optical polarization splitting and combining means defined by a polarization splitting cube C1 (or PBS, Polarization Beam Splitter) having four inputs outputs ES1, ES2, ES3, ES4, each input-output being connected to a branch B1, B2, B3, B4, respectively.

The branches B1, B2 and B3 each comprise at their end a highly reflective mirror M1, M2, M3. The branches B1, B2 and B3 are retro-reflection branches, an optical beam entering by the input-output port of one of these branches B1, B2 or B3, being reflected following a reverse optical path toward the same input-output port. The first branch B1 comprises a first Faraday rotator R1 (a first polarization means (R1)) arranged between the first input-output port ES1 and the first mirror M1. Likewise, the second branch B2 comprises a second Faraday rotator R2 (a second polarization means (R2)) arranged between the second input-output port ES2 and the second mirror M2. The first Faraday rotator R1 is configured so as to rotate the polarization of an optical beam by 45 degrees at each go-and-return passage in the first branch B1, so that the beam exiting by the input-output port ES1 has a polarization orthogonal to that of the same optical beam entering by the same port ES1. Likewise, the second Faraday rotator R2 is configured so as to rotate the polarization of an optical beam by 45 degrees at each go-and-return passage in the second branch B2, so that the beam exiting by the input-output port ES2 has a polarization orthogonal to that of the same optical beam entering by the same port ES2. The third branch B3 comprises a quarter-wave plate R3 (or λ/4 plate) (a third polarization means (R3)) arranged between the third input-output port ES3 and the third mirror M3. The axes of the quarter-wave plate R3 are oriented with respect to the proper axes of the polarization splitting cube C1 in such a manner that a linearly polarized beam entering the branch B3 by the port ES3 is transformed into a circularly polarized beam after a first travel through the quarter-wave plate R3, then reflected by the mirror M3, and travels again through the quarter-wave plate R3 to form a linearly polarized beam exiting the branch B3, with a polarization orthogonal to that of the same entering beam. Hence, the polarization of a linearly polarized optical beam performs a rotation of 90 degrees after each go-and-return passage in each of the three branches B1, B2 and B3.

The fourth branch B4 is the input-output branch of the interferometer. The branch B4 receives a linearly polarized incident beam $S_0$, with a polarization axis preferably at 45 degrees with respect to the axes of the polarization splitting cube C1. The polarization splitting cube C1 splits the incident beam $S_0$ into two secondary beams $H^1$, linearly s-polarized, and $H^2$, p-polarized.

First, the propagation of the first, initially s-polarized, secondary beam $H^1$ through the base cell will be detailed in relation with FIG. 2. Next, the propagation of the first, initially p-polarized, secondary beam $H^2$ through the base cell will be detailed in relation with FIG. 3.

In FIG. 2 and following Figures, a s-polarized beam, i.e. a beam with a linear polarization perpendicular to the plane of the sheet, is represented by a centered disc, and p-polarized beam, i.e. a beam of linear polarization parallel to the plane of the sheet, is represented by a double arrow. The simple arrows indicate the direction of propagation of an optical beam.

FIG. 2 shows the same base cell as FIG. 1, in which has been schematically represented the propagation of the s-polarization component $H^1$ of the incident beam $S_0$. The port ES4 of the splitting cube receives an entering beam $H^1_{4i}$ propagating in the branch B4. The beam $H^1_{4i}$ being s-polarized, it is reflected by the splitting cube C1 toward the branch B2 and forms a beam $H^1_{2i}$ entering the branch B2 and s-polarized. After double travel through the Faraday rotator R2 and reflection on the mirror M2, the beam $H^1_{2o}$ exiting the second branch B2 is now p-polarized. The splitting cube C1 then transmits this beam $H^1_{2o}$ toward the first branch B1, where it forms a p-polarized entering beam $H^1_{1i}$. After double travel through the first Faraday rotator R1 and reflection on the mirror M1, the beam $H^1_{1o}$ exiting the first branch B1 is again s-polarized. The polarization splitting cube C1 receives the beam $H^1_{1o}$ on the input-output port ES1 and reflects it toward the third branch B3, where it forms a s-polarized entering beam H. After reflection on the mirror M3 and double travel through the quarter-wave plate R3, the beam $H^1_{3o}$ exiting the third branch is p-polarized. The cube C1 thus transmits the p-polarized beam $H^1_{3o}$ to the fourth branch, where it forms a first, p-polarized, secondary output beam $H^1_{4o}$. The insert in FIG. 2 schematically shows the optical path followed by the initially s-polarized component $H^1$ through the base cell: the beam $H^1$ has entered the fourth branch B4, has performed a go-and-return travel in the second branch B2, a go-and-return travel in the first branch B1, a go-and-return travel in the third branch B3, and has exit the fourth branch B4 in the reverse direction with respect to the incident beam and with a p-polarization opposed to the s-polarization of the component $H^1_{4i}$ of the incident beam $S_0$.

Similarly to FIG. 2, FIG. 3 shows the same base cell, in which has been schematically represented the propagation of the p-polarization component $H^2$ of the incident beam $S_0$. The port ES4 of the splitting cube receives an entering beam $H^2_{4i}$ propagating in the branch B4. The beam $H^2_{4i}$ being p-polarized, it is transmitted by the splitting cube C1 to the branch B3 and forms a beam $H^2_{3i}$ entering the branch B3 and p-polarized. After reflection on the mirror M3 and double travel through the quarter-wave plate R3, the beam $H^2_{3o}$ exiting the third branch is s-polarized. The polarization splitting cube C1 receives the beam $H^2_{3o}$ on the input-output port ES3 and reflects it toward the first branch B1, where it forms a s-polarized entering beam $H^2_{1i}$. After double travel through the first Faraday rotator R1 and reflection on the mirror M1, the beam $H^2_{1o}$ exiting the first branch B1 is again p-polarized.

The splitting cube C1 then transmits this beam $H^2_{1o}$ to the second branch B2, where it forms a p-polarized entering beam $H^2_{7i}$. After double travel through the Faraday rotator R2 and reflection on the mirror M2, the beam $H^2_{2o}$ exiting the second branch B2 is now s-polarized. The cube then reflects the s-polarized beam $H^2_{2o}$ toward the fourth branch, where it forms a second, s-polarized, secondary output beam $H^2_{4o}$. The insert in FIG. 3 schematically shows the optical path followed by the initially p-polarized component $H^2$ through the base cell, and the order of passage in the different branches: the beam $H^2$ has entered the fourth branch B4, has performed a go-and-return travel in the third branch B3, a go-and-return travel in the first branch B1, a go-and-return travel in the second branch B2, and has exit the fourth branch B4 in the reverse direction with respect to the incident beam and with a s-polarization opposed to the p-polarization of the component $H^2_{4i}$ of the incident beam $S_0$.

The secondary beams $H^1$ and $H^2$ thus follow two perfectly reciprocal optical paths in the interferometer.

The two output components, $H^1_{4o}$ p-polarized and $H^2_{4o}$ s-polarized, respectively, are superimposed to each other not only spatially and temporally, but also in polarization, to form a linearly polarized recombined beam having its proper axes at 45 degrees with respect to the p and s axes, provided that the two components, $H^1_{4o}$ p-polarized and $H^2_{4o}$ s-polarized, have the same output amplitude. In the case where the two components, $H^1_{4o}$ p-polarized and $H^2_{4o}$ s-polarized, do not have the same output amplitude, a polarization-coherent recombination is also obtain, the output beam still having a linear polarization, but the polarization axis of the recombined beam is inclined by an angle that depends on the respective amplitudes of the two components. A coherently recombined output beam $S_1$ is thus obtained at the output of the passive device of FIG. 2.

To sum up, the optical system illustrated in FIGS. 1 to 3 behaves as a perfectly reflective mirror, for which the incident beam $S_0$ is split into two parts $H^1$ and $H^2$, polarized orthogonally relative to each other, which are temporally and spatially split to be finally recombined temporally, spatially and in polarization, their respective polarizations having been swapped. The input beam has a linear polarization oriented at 45° with respect to the neutral axes of the PBS. The latter thus splits the input into two beams of same power and orthogonal polarizations s and p. Each of these beams follows a different path through the system, but these paths being reciprocal to each other, each secondary beam generally accumulates the same optical phase. The recombination of two orthogonal polarization components thus allows obtaining a coherent recombination.

It will now be described how such a device may advantageously be used to combine beams amplified by independent optical amplifiers.

FIGS. 4 to 6 schematically show a device for the coherent combination of two optical amplifiers according to a preferred embodiment of the invention.

FIG. 4 schematically shows the architecture of a device for the combination of two optical amplifiers. The device of FIG. 4 comprises a base cell similar to that described in relation with FIG. 1. The device further comprises a first optical amplifier A1 and a second optical amplifier A2. The first optical amplifier A1 is arranged on the first branch B1, preferably between the Faraday rotator R1 and the mirror M1. Symmetrically, the second optical amplifier A2 is arranged on the second branch B2, preferably between the Faraday rotator R2 and the mirror M2. Preferably, the two amplifiers A1 and A2 operate in linear polarization. Ideally, the two amplifiers A1 and A2 have the same properties (gain, stored energy, geometry) and do not induce depolarization. The device of FIG. 4 further includes a light source 2 which is, for example, a pulsed laser source. The device also includes an optical isolator formed of a Faraday rotator R4 at 45 degrees and of a polarization splitting cube C4, the optical isolator being arranged on the fourth branch B4 between the source 2 and the input-output ES4.

Alternatively, for example for optical amplifiers A1 and A2 operating in circular polarization, the two Faraday rotators R1 and R2 may be each replaced respectively by a quarter-wave plate.

The light source 2 generates a linearly polarized incident beam $S_0$, of polarization p. The splitting cube C4 transmits the incident beam $S_0$ without modifying its polarization. The Faraday rotator R4 is configured to rotate the polarization of the beam $S_0$ by 45 degrees. The incident beam on the input port ES4 then comprises a s polarization component that will be called $H^1_{4i}$ and a p polarization component that will be called $H^2_{4i}$.

FIG. 5 schematically illustrates the propagation of the initially s-polarized component $H^1_{4i}$ of the incident beam through a device for the combination of two amplifiers as shown in FIG. 4. This component follows the same optical path as that described in relation with FIG. 4. The component $H^1_{4i}$ is firstly reflected by the cube C1 toward the second branch. On the go travel in the second branch, the entering beam $H^1_{2i}$ is s-polarized. The Faraday rotator R2 rotates by 45 degrees the polarization axis of the beam $H^1_{2i}$ that remains linearly polarized. The second amplifier A2 amplifies a first time the beam $H^1_{2i}$. After reflection on the second mirror M2, the beam keeps its polarization and is amplified a second time by the second amplifier A2. The Faraday rotator R2 rotates by 45 degrees the polarization axis of the beam $H^1_{2o}$ that remains polarized linearly, but with a polarization p. The splitting cube C1 transmits this beam amplified twice by the second amplifier to the first branch B1. Similarly, the p-polarized beam $H^1_{2i}$ entering the branch B1 sees its polarization rotated by 45 degrees by passing through the Faraday rotator R1, then is amplified a first time by the first amplifier A1. After reflection on the mirror M1, the beam is amplified a second time by the first amplifier A1, then its polarization is rotated by 45 degrees. The beam exiting the branch B1, amplified twice by the second amplifier A2, then twice by the first amplifier A1, is reflected toward the branch B3 before exiting on the fourth branch as a beam $H^1_{4o}$ of polarization p. The order of passage of an initially s-polarized beam $H^1$ in the different branches of the device is schematically shown as an insert in FIG. 5.

Similarly, FIG. 6 schematically illustrates the propagation of the initially p-polarized component $H^2_{4i}$ of the incident beam through a device for the combination of two amplifiers as shown in FIG. 4. This component $H^2_{4i}$ follows the same optical path as described in relation with FIG. 3. The component $H^2_{4i}$ is firstly transmitted by the cube C1 to the third branch B3 that reflects it as a s-polarized beam $H^2_{3o}$ toward the first branch B1. On the go travel on the first branch B1, the entering beam $H^2_{1i}$ is s-polarized. The Faraday rotator R1 rotates by 45 degrees the polarization axis of the beam $H^2_{1i}$ that remains linearly polarized. The first amplifier A1 amplifies a first time the beam $H^2_{1i}$. After reflection on the first mirror M1, the beam keeps its polarization and is amplified a second time by the first amplifier A1. The Faraday rotator R1 rotates by 45 degrees the polarization axis of the beam $H^2_{1o}$ that remains linearly polarized, but with a polarization p. The splitting cube C1 transmits this beam amplified twice by the first amplifier to the second branch B2. Similarly, the p-polarized beam $H^2_{2i}$ entering the branch B2 sees its polarization rotated by 45 degrees by passing through the Faraday rotator R2, then is amplified once by the second amplifier A2. After reflection on the mirror M2, the beam is amplified a second time by the second amplifier A2, then its polarization is rotated by 45 degrees. The beam exiting the branch B2, amplified twice by the first amplifier A1, then twice by the second amplifier A2, is reflected toward the fourth branch B4 as a beam $H^2_{4o}$ of polarization s. The order of passage of an initially s-polarized beam in the different branches of the device is schematically shown as an insert in FIG. 5.

On the input-output port ES4 is thus obtained the spatial and temporal superimposition of a component $H^1_{4o}$ of polarization p and a component $H^2_{4o}$ of polarization s, which then form a linearly polarized recombined beam $S_1$, of axis of polarization at 45 degrees with respect to the proper axes of the cube C1 The recombined output beam $S_1$ may be easily split from the input beam using an optical isolator. For example, the Faraday rotator R4 rotates by 45 degrees the polarization axis of the recombined beam $S_1$ that becomes s-polarized. The splitting cube C4 then reflects the coherent recombined output beam $S_1$ so as to split it from the direction of the incident beam $S_0$.

The device described in relation with FIGS. 4 to 6 allows a perfectly symmetrical amplification for the two secondary beams. In the case of a pulsed laser beam, each amplifier first sees a low energy pulse, then an already once-amplified pulse. Each pulse first sees an amplifier fully reversed by the pump, then an amplifier partially depleted by a preceding pulse. The beams $H^1$ and $H^2$ are split on the input port ES4 of the interferometer, cross each other a first time in the interferometer then a second time on the input-output port ES4, where they are recombined. However, the beams $H^1$ and $H^2$ do not necessary cross each other in the branch B1. Indeed, the length of the optical path of the branch B3 is far lower than the length of the branches B1 and B2 that each comprise an optical amplifier. In particular, in the case of optical fiber amplifiers, the length of each amplifier A1 or A2 exceeds several tens of centimeters. Advantageously, the lengths of the branches B1, B2 and B3 are optimized so that the secondary beams $H^1$ and $H^2$ are not temporally superimposed in one of the optical amplifiers A1 or A2. On the other hand, the total length of the branches B1 B2 and B3 is maintained the shortest possible so as to reduce the sensitivity of the interferometer device relative to external disturbances.

In the device shown in FIGS. 4 to 6, the optical amplifier A1 is arranged between the Faraday rotator R1 and the mirror M1, and respectively the optical amplifier A2 is arranged between the Faraday rotator R2 and the mirror M2. Consequently, each optical amplifier amplifies before reflection and after reflection on the mirror a beam polarized with a same polarization state, advantageously following a proper axis of the amplifier. According to an alternative embodiment, the Faraday rotator R1 (or the equivalent quarter-wave plate) is arranged between the optical amplifier A1 and the mirror M1, and/or respectively the Faraday rotator R2 (or the equivalent quarter-wave plate) is arranged between the optical amplifier A2 and the mirror M2. That way, each amplifier A1 (respectively A2) amplifies a first time a beam polarized following a polarization state on the go travel, i.e. before reflection on the mirror at the end of its branch, then amplifies a second times the beam polarized following an orthogonal polarization state after reflection on the mirror.

The generalization of the schema of FIG. 4 to the case of N amplifiers is made considering that a combination system as described according to FIG. 4 behaves as a single reflection optical amplifier.

FIG. 7 shows an example of a device for the coherent combination of four optical amplifiers. The device of FIG. 7 comprises a base cell comprising a polarization splitting cube C1, connected to four branches B1, B2, B3 and B4. The branches B3 and B4 are identical to those of FIG. 4. The first amplifier A1 and the first mirror M1 of the first branch B1 have been replaced by another device D1 for the coherent combination of two amplifiers A1 and A2, as shown in FIG. 4. Likewise, the second amplifier A2 and the second mirror M2 of the second branch B2 have been replaced by another device D2 for the coherent combination of two amplifiers A3 and A4, as shown in FIG. 4. The Faraday rotators R1 and R2 are configured so as to rotate the polarization by 45 degrees at each go-and-return passage. That way, the polarization of a beam changes from p to s, and vice versa, at each go-and-return travel in a branch having a mirror at its end. At each passage from the first polarization splitting cube C1 to another polarization splitting cube C2 or C3, a linearly p-polarized, respectively s-polarized, beam sees its polarization axis rotated by 45 degrees, and is once again split on the other polarization splitting cube, respectively C2 or 03, into two sub-beams. Conversely, when two sub-beams are recombined at the output of a two optical amplifier system on the branch B8, respectively B12, and form a linearly polarized beam with a proper axis inclined by 45 degrees, the polarization rotator R1, respectively R2, rotates once again this polarization by 45 degrees. Hence, the passage of a beam in a sub-unit D1, respectively D2, transforms an incident beam of polarization p into an output beam of polarization s, and vice versa. By following a reasoning similar to that developed in relation with FIGS. 4 to 6, it can be verified that the initially s-polarized component entering on the input-output port ES4 on the first polarization splitting cube C1 follows successively the following optical path through the different branches of the device of FIG. 7: B4-B2-B8, then is split by C2 into two derived beams, one of the derived beams traveling through the branches B7-B6-B5, and the other of the derived beams traveling through the branches B5-B6-B7, these two derived beams being recombined on C2 into a beam traveling through the branches B8-B2-B1-B12, then being once again split, on C3, into two derived beams, one of the derived beams traveling through the branches B10-B9-B11, and the other of the derived beams traveling through the branches B11-B9-B10, and these two derived beams being recombined on C3 into a beam traveling through the branches B12-B1-B3-B4 and forming a p-polarized output component on the input-output port ES4. As regard the amplification, the first, initially s-polarized, secondary beam is split into two derived beams, one of the derived beams being amplified successively twice by the amplifier A4, then twice by the amplifier A3, while the second derived beams is amplified successively twice by the amplifier A3, then twice by the amplifier A4; these two derived beams amplified twice (by A3 and A4) are recombined into a secondary beam that is transmitted to the other amplification stage, so as to be split therein into two derived beams, one of the derived beams being amplified successively twice by the amplifier A2, then twice by the amplifier A1, while the second derived beam is amplified successively twice by the amplifier A1, then twice by the amplifier A2, these two derived beams being recombined into a secondary beam that is transmitted to the output. Reciprocally, the initially p-polarized component entering the input-output port ES4 of the first polarization splitting cube C1 follows successively the following optical path through the different branches of the device of FIG. 7: B4-B3-B1-B12, then is split into two derived beams, one of the derived beams traveling through the branches B11-B9-B10, while the other derived beam travels through the branches B10-B9-B11 these two derived beams being recombined into a beam travelling through the branches B12-B1-B2-B8, then is split once again into two derived beams, one of the derived beams traveling through the branches B5-B6-B7 while the other derived beam travels through the branches B7-B6-B5, these two derived beams being recombined into a beam traveling through the branches B8-B2-B4 to form a s-polarized output component on the input-output port ES4. As for the amplification, the second, initially p-polarized, secondary beam is split into two derived beams, one of the derived beams being amplified successively twice by the amplifier A1, then twice by the amplifier A2, while the second derived beam is amplified successively twice by the amplifier A2, then twice by the amplifier A1; these two derived beams amplified twice (by A1 and A2) are recombined into a secondary beam that is transmitted to the other amplification stage to be split therein into two derived beams, one of the derived beams being amplified successively twice by the amplifier A3, then twice by the amplifier A4, while the second derived beam is amplified successively twice by the amplifier A4, then twice by the amplifier A3, these two derived beams being recombined into a secondary beam that is transmitted to the output. It can be noticed that the secondary beams have optical paths passing by all the branches of the device and in an order exactly opposite, i.e. following paths that are perfectly reciprocal two by two.

This method thus allows the passive coherent combination of N amplifiers, but also, each of the amplifiers operates as a N-passage amplifier. Therefore, if the number of amplifiers is increased, the number of passage therein is also increased, which improves the extraction efficiency. This is particularly useful is the case of amplifiers having a low gain for one passage, but a high saturation fluence. If $N=2^n$, with n integer, as in the case of two amplifiers, the order of the passages in each of the amplifiers corresponds exactly to the situation in which there will be a single amplifier having several passages, whatever the total number of combined amplifiers. Therefore, during the phase of amplification corresponding to the k-th passage in the amplifiers, all the pulses have already seen (k−1) passages in the other amplifiers, and each amplifier has already amplified (k−1) pulses. During the amplification process, all the amplifiers thus remain equivalent (gain at the k-th passage, remaining stored energy) and each replica has the same energy. This property guaranties an efficient coherent combination because is it translated by a constant equilibrium in the powers contained by each of the polarization states s and p at each point of the amplification network.

In order to demonstrate the capacities of the device and the method of the invention, an embodiment will now be described in detail, which is based on a coherent combination of four amplifiers based on $Yb:CaF_2$ crystal. This material is very interesting due to certain properties, among which its very high capacity of storing the energy of the pumping source. However, its relatively low gain has until now limited to about ~10% the efficiency of energy extraction from standard amplifiers based on $Yb:CaF_2$. The following example shows the capacity of the technique of coherent combination to obtain both a high output energy and an excellent extraction efficiency.

FIG. 8 schematically illustrates a multiple-passage amplifier that can be used in a particular embodiment of the invention. In particular, reference is made to a device such that of FIG. 7, wherein each of the optical amplifiers A1. A2, A3, A4 is consisted of a multiple-passage amplifier of the type of that shown in FIG. 8.

The multi-passage configuration of FIG. 8 is a conventional configuration based on a system of imagery 2f-2f comprising a lens of focal length f, a retro-reflector (mirrors M', M" and Mi) at a distance f from the lens, and an amplifier medium Ai also placed at a distance f from the lens, in a configuration said "active mirror". This is obtained by providing an anti-reflective coating on the front face of the crystal at the two signal and pump wavelengths (1030 nm and 980 nm, respectively) and a highly reflective coating on the rear face at these two wavelengths. By supposing that the optical system and the crystal do not introduce aberrations, the beam is continuously reimaged in the plane of the crystal (after each passage through the crystal) and the input object plane is imaged on the output image plane. Let's consider, in the particular example, a $Yb:CaF_2$ crystal of 5 mm thick, doped at 2.7%, and a total number of 6 passages (a passage is defined herein as a full passage from the entry to the exit of the crystal). A total available pump power of 1 kW at 980 nm is considered, which is supposed to be equally distributed between for identical amplifiers to be combined. Supposing that the period of repetition of the pump is equal to the fluorescence time constant of the crystal used, i.e, 2,4 ms, the pump power $E_{pump}$ corresponds to 2.4 J, the total pump energy being equally distributed between the four amplifiers (for each amplification cycle). An input pulse having an energy of 8 mJ at 1030 nm is temporally stretched at a sufficient duration (~10 ns) to avoid any optical damage. The fluence of the amplified signal on the crystal is maintained under the damage threshold of 5 $J/cm^2$. It is considered that the optical components have an efficiency higher than, respectively, 99.9% for the mirrors and lenses, 99.5% for the quarter-wave plates and about 99% for the splitting cubes and the Faraday rotators. In these conditions, each amplifier stores about 390 mJ, which corresponds to a small-signal gain of about 1.3. Taking into consideration the losses of the optical components of the system and supposing a final recombination efficiency of 95%, a simulation of a four-amplifier coherent network allows obtaining an output energy $E_{out,total}$ equal to 1 J (i.e. about 265 mJ per amplifier), corresponding to a total gain $G_{tot}$ equal to 125, and a global efficiency $n_{global}$ equal to 41% ($E_{pump}/E_{out,total}$), for an extraction efficiency $n_{extr}$ approaching 64%, the extraction efficiency being defined as the ratio between the energy stored in the active medium and the output energy. By increasing the number of passages to 10 in each amplifier, these performances can be still improved with: an output energy $E_{out,total}$ equal to 1.2 J. a total gain $G_{tot}$ equal to 150, a global efficiency $n_{global}$ equal to 50% and an extraction efficiency $n_{ext}$ equal to 82%.

This technique allows coherently and passively combining N ($N=2^n$, with n integer) optical amplifiers. This method consists in splitting the incident beam into N replicas, each propagating through the amplification network consisted of N amplifiers. Therefore, each replica is amplified at the same final energy. The different replicas thus follow optical paths that are reciprocal two by two and accumulate an identical optical phase. At the output of the network of amplifiers, the coherent combination of the N replicas is thus possible.

The device for coherent combination of the invention has many advantages. Firstly, this device is passive, which simplifies considerably the complexity of the assembly, compared to an active device for coherent combination based on a real-time feedback control system. Next, the device allows combining simply not only two optical amplifiers, but also a number N of amplifiers that may be very higher than two, while improving the performances of each amplifier. Indeed, the device allows improving the extraction efficiency of each optical amplifier as the number of amplifiers increases, the amplification being distributed between the different amplifiers and split into several passages for each amplifier.

The invention claimed is:

1. A passive device for the coherent combination of a plurality of optical amplifiers, characterized in that the device comprises an amplitude-division interferometer having at least four branches (B1, B2, B3, B4), said interferometer comprising:
    optical polarization splitting and combining means (C1) having four input-output ports (ES1, ES2, ES3, ES4), each input-output port (ES1, ES2, ES3, ES4) being respectively connected to one of the four branches (B1, B2, B3, B4),
    the first branch (B1) comprising a first polarization means (R1), a first bidirectional optical amplifier (A1) and a first mirror (M1) forming the end of said first branch (B1),
    the second branch (B2) comprising a second polarization means (R2), a second bidirectional optical amplifier (A2) and a second mirror (M2) forming the end of the second branch (B2),
    the third branch (B3) comprising a third polarization means (R3) and a third mirror (M3) forming the end of said third branch (B3),
    said first, second and third polarization means (R1, R2, R3) being configured so that a polarized optical beam entering respectively said first, second or third branch (B1, B2, B3), respectively by the first, second or third input-output port is reflected respectively by the first, second, third mirror (M1, M2, M3) to form a polarized optical beam exiting said branch, having a polarization orthogonal to the polarization of said polarized optical beam entering said branch,
    the fourth branch (B4) being an input-output branch of said interferometer arranged so as to receive and direct a polarized incident optical beam ($S_0$) toward the fourth input-output port (ES4),
    the optical polarization splitting and combining means (C1) being configured so as to split in polarization the polarized incident beam ($S_0$) into a first secondary input beam ($H^1_{4i}$) and a second secondary input beam ($H^2_{4i}$), said first and second secondary input beams having mutually orthogonal polarizations, the first secondary input beam ($H^1_{4i}$) travelling through the first, second and third branches of the interferometer following a first optical path to form a first amplified output beam ($H^1_{4o}$) and the second secondary input beam ($H^2_{4i}$) travelling through the first, second and third branches of the interferometer following a second optical path, reciprocal to the first optical path, to form a second amplified output beam ($H^2_{4o}$), said first and second amplified output beams ($H^1_{4o}$, $H^2_{4o}$) having mutually orthogonal polarizations, and
    said splitting and recombining means (C1) being configured so as to receive and to spatially, temporally and coherently recombine said first amplified output beam ($H^1_{4o}$) and said second output amplified beam ($H^2_{4o}$), to form a coherent output beam ($S_1$) propagating in the fourth branch (B4) in the reverse direction with respect to the polarized incident optical beam ($S_0$).

2. The passive device for coherent combination according to claim 1, wherein said splitting and recombining means comprise a polarization splitting cube (C1).

3. The passive device for coherent combination according to claim 1, further comprising an optical isolator (R4, C4) arranged on the fourth branch (B4).

4. The passive device for coherent combination according to claim 1, wherein said first, second and/or third polarization means (R1, R2, R3) comprise a quarter-wave plate or a bidirectional Faraday rotator configured so as to rotate the polarization of a linearly polarized optical beam by 90 degrees after a double passage.

5. The passive device for coherent combination according to claim 1, wherein said first and second optical amplifiers have the same optical amplification gain.

6. The passive device for coherent combination according to claim 1, wherein said first and second optical amplifiers (A1, A2) each comprise respectively a multiple-passage optical amplifier.

7. The passive device for coherent combination according to claim 1, wherein said first and second optical amplifiers (A1, A2) are optical fiber amplifiers.

8. A passive device for the coherent combination of four optical amplifiers (A1, A2, A3, A4) comprising a passive device for the coherent combination of two optical amplifiers according to claim 1, wherein the two sub-units comprising an optical amplifier (A1, A2) and a mirror (M1, M2) of the first and the second branches (B1, B2), respectively, are each respectively replaced by another passive device of the coherent combination of two optical amplifiers.

9. A passive device for the coherent combination of $2^n$ optical amplifiers (A1, A2, ... A2$^n$), n being an integer higher than or equal to one, comprising ($1+2^{n-1}$) passive devices for the coherent combination of two optical amplifiers according to claim 1, wherein $2^{n-1}$ passive devices for the coherent combination of two optical amplifiers are arranged symmetrically on the branches of a device.

10. A passive method for the coherent combination of a plurality of optical amplifiers, comprising the following steps:
    coupling a polarized incident beam ($S_0$) to the fourth branch of a passive device of coherent combination according to claim 1,
    splitting the polarized incident beam ($S_0$) into a first secondary input beam ($H^1$) and a second secondary input beam ($H^2$), said first and second secondary input beams having mutually orthogonal polarizations,
    addressing the first secondary input beam ($H^1$) so that it travels successively through the first, second and third branches of the interferometer following a first optical path and so that the first secondary input beam ($H^1$) is amplified twice by the first amplifier (A1), then twice by the second amplifier (A2), to form a first amplified output beam ($H^1_{4o}$),
    addressing the second secondary input beam ($H^2$) so that it travels successively through the first, second and third branches of the interferometer following a second optical path, reciprocal to the first optical path, and so that the second secondary input beam ($H^2$) is amplified twice by the second amplifier (A2), then twice by the first amplifier (A1), to form a second amplified output beam ($H^2_{4o}$),
    modifying the polarization of the first secondary beam at each passage in the first, second and third branches of the interferometer, the polarization of the first secondary beam entering a branch being orthogonal to the polarization of the first secondary beam exiting said branch,
    modifying the polarization of the second secondary beam at each passage in the first, second and third branches of the interferometer, the polarization of the second secondary beam entering a branch being orthogonal to the polarization of the second secondary beam exiting said branch,
    recombining spatially, temporally and in polarization the first amplified output beam ($H^1_{4o}$) and the second amplified output beam ($H^2_{4o}$), to form an amplified coherent output beam ($S_1$) propagating in the fourth branch (B4) in the reverse direction with respect to the polarized incident optical beam ($S_0$).

11. The passive device for coherent combination according to claim 2, further comprising an optical isolator (R4, C4) arranged on the fourth branch (B4).

12. The passive device for coherent combination according to claim 2, wherein said first, second and/or third polarization means (R1, R2, R3) comprise a quarter-wave plate or a bidirectional Faraday rotator configured so as to rotate the polarization of a linearly polarized optical beam by 90 degrees after a double passage.

13. The passive device for coherent combination according to claim 3, wherein said first, second and/or third polarization means (R1, R2, R3) comprise a quarter-wave plate or a bidirectional Faraday rotator configured so as to rotate the polarization of a linearly polarized optical beam by 90 degrees after a double passage.

14. The passive device for coherent combination according to claim 2, wherein said first and second optical amplifiers have the same optical amplification gain.

15. The passive device for coherent combination according to claim 2, wherein said first and second optical amplifiers (A1, A2) each comprise respectively a multiple-passage optical amplifier.

16. The passive device for coherent combination according to claim 2, wherein said first and second optical amplifiers (A1, A2) are optical fiber amplifiers.

* * * * *